Patented Oct. 7, 1941

2,258,131

UNITED STATES PATENT OFFICE 2,258,131

PROCESS FOR THE MANUFACTURE OF PREGNENDIONE AND INTERMEDIATES OBTAINED THEREBY

Adolf Butenandt, Berlin-Dahlem, Germany, assignor to Schering Corporation, Bloomfield, N. J., a corporation of New Jersey No Drawing. Application December 29, 1937, Serial No. 182,322. In Germany December 31, 1936

11 Claims. (Cl. 260—397.3)

This invention relates to a process for the manufacture of pregnendione and to the intermediates obtained thereby, and is a modification of the process of my U. S. application Serial No. 34,599, of which the present application is a continuation-in-part.

In application Serial No. 34,599 a process is described by means of which it is possible to produce from pregnenolones by oxidation of the hydroxy group the corresponding pregnendiones. According to this process it is, for example, possible to produce from pregnenol-3-one-20 the pregnendione-3.20 of melting point 128.5° C. which is identical with the corpus luteum hormone isolated from ovaries.

I have found that, in accordance with the present invention, in the oxidation of iso-pregnenolone ($C_{21}H_{32}O_2$), which as regards the steric arrangement of the side chain on the carbon atom 17 is isomeric with the pregnenolone which can be produced from hydroxy bisnorcholenic acid, there is produced not the corresponding iso-pregnendione but the pregnendione of the formula $C_{21}H_{30}O_2$ which is the corpus luteum hormone.

The oxidation of the iso-pregnenolone is carried out under acid conditions in the same manner as the oxidation of the different pregnenolones or pregnendiols it being recommended to carry out the oxidation with protection of the nuclear double bond, for example, by adding on halogen as, for example, bromine, or halogen hydride as, for example, hydrochloric acid, to yield the halogenated, for example the dibrominated, monochlorinated, etc., derivatives of isopregnenolone.

The splitting off of halogen hydride for the purpose of reinstatement of the double bond in the ring system can be carried out, for example, with pyridine bases, alkali acetates in alcohol solution or other alkaline-acting agents, as are described, for example, in Houben-Weyl "Methods of organic chemistry," 2nd edition, vol. 2, pages 746–747, 1922.

The splitting off of halogen from the dihalogen compounds takes place with zinc dust in neutral or acid solution, as, for example, in alcoholic or acetic acid solution, or also by other suitable methods, for example, by treatment with sodium iodide in acetone corresponding to the process of Finkelstein, careful treatment with hydrogen in the presence of catalysts, such as platinum or nickel, and of basic agents, in which case care is taken that hydrogenation of the double bond does not take place, or by other methods as are described, for example, in Houben-Weyl "Methods of organic chemistry," 2nd edition, vol. 2, pages 301–304, 1922.

The oxidation is advantageously carried out with chromium trioxide but also other hexavalent chromium compounds, such as chromium oxychloride, dichromates in acid solution and the like can be used. One can also employ the alkali and alkaline earth permanganates and other known agents which are capable of converting a hydroxy group into a keto group without any essential splitting of the ring system and/or splitting off of the side chain taking place.

The separation and purification of the diketone formed can, for example, be carried out by fractional distillation or sublimation in high vacuum. It is also possible, however, to separate the ketone by reaction with ketone reagents, as, for example, with semicarbazide, thiosemicarbazide, phenylhydrazine or other substances which condense with keto groups. Such substances include in addition to those specified hydroxylamine, the substitution products of phenylhydrazine, such as p-nitrophenylhydrazine, p-bromophenylhydrazine, diphenylhydrazine, benzylhydrazide and the like. The splitting up of the compounds obtained by reaction with ketone reagents, for example, the splitting up of the semicarbazones and the like takes place in the customary manner, for example, by treatment with acid agents, if desired in the presence of suitable solvents.

The following example serves to illustrate the invention without, however, limiting the same to them:

Example 500 mg. of iso-pregnenolone of M. P. 172–173° C. and $$[\alpha]_D^{20} = -140.5°,$$

as is obtainable, for example, by isomerisation of pregnenolone by means of methyl alcoholic caustic potash lye and treatment of the isomerisation solution with digitonine for the purpose of separation of the normal pregnenolone, are dissolved in 15 ccs. of glacial acetic acid and treated with 0.080 ccs. of bromine in 5 ccs. of glacial acetic acid with cooling. Then the quantity of $CrO_3$ corresponding to 3 atoms of available oxygen in 9.15 ccs. of glacial acetic acid is added and the whole allowed to stand for 14 hours at room temperature. Thereupon the whole is treated with water and extracted with ether, washed with bicarbonate solution and the ether distilled off from a bath at 30° C. Subsequently debromination is carried out with 1 gram of zinc dust and 30 ccs. of glacial acetic acid at 15° C. The reaction product is taken up in ether as above. From a little alcohol there crystallize in the cold first 102 mg. of M. P. 116–119° C., which after repeated recrystallization rises to 128° C.

$$[\alpha]_D^{20} = +192° \text{ (alcohol)}$$

Mixed melting point with progesterone shows no depression. On high vacuum distillation of the mother liquors further quantities of normal progesterone pass over.

Of course, many changes and variations in the reaction conditions and the like may be employed by those skilled in the art in accordance with the principles set forth herein and in the claims annexed hereto.

What I claim is:

1. Process for the manufacture of pregnendione of the formula $C_{21}H_{30}O_2$, wherein iso-pregnenolone is subjected under acid conditions to the action of an oxidizing agent capable of converting a secondary alcohol group into a keto group.

2. Process as claimed in claim 1, in which a hexavalent chromium compound is used as oxidizing agent.

3. Process as claimed in claim 1, in which chromium trioxide is used as oxidizing agent.

4. In a process for the manufacture of pregnendione of the formula $C_{21}H_{30}O_2$, the steps comprising reacting iso-pregnenolone with a substance capable of intermediately protecting the double bond against oxidation, and then subjecting the so-protected compound under acid conditions to the action of an oxidizing agent capable of converting a secondary alcohol group into a keto group.

5. Process as claimed in claim 4, wherein the ring double bond is intermediately protected with bromine.

6. Process as claimed in claim 4, wherein the protecting agent is a halogen hydride, and including the step of subjecting the oxidized compound to the action of an agent capable of removing the halogen hydride and thereby restoring the double bond.

7. Process as claimed in claim 4, wherein the protecting agent is a halogen, and including the step of reacting the oxidized compound with zinc dust to remove the halogen and restore the double bond.

8. Process as claimed in claim 4, wherein the protecting agent is a halogen, and including the step of reacting the oxidized compound with zinc dust in acetic acid solution to remove the halogen and restore the double bond.

9. A halogenated derivative of an isopregnenolone of the formula $C_{21}H_{32}O_2$.

10. A dihalogenated derivative of an isopregnenolone of the formula $C_{21}H_{32}O_2$.

11. A dibrominated derivative of an isopregnenolone of the formula $C_{21}H_{32}O_2$.

ADOLF BUTENANDT.